United States Patent [19]

Scholder

[11] Patent Number: 5,578,991
[45] Date of Patent: Nov. 26, 1996

[54] SECURITY SYSTEM AND METHOD FOR A PORTABLE PERSONAL COMPUTER

[75] Inventor: Erica J. Scholder, Austin, Tex.

[73] Assignee: Dell USA, L.P., Austin, Tex.

[21] Appl. No.: 348,387

[22] Filed: Dec. 2, 1994

[51] Int. Cl.⁶ .................................................. G08B 13/14
[52] U.S. Cl. ........................ 340/571; 340/653; 340/666; 340/691; 340/692
[58] Field of Search .................................. 340/571, 568, 340/653, 666, 691, 692

[56] References Cited

U.S. PATENT DOCUMENTS

| | | | |
|---|---|---|---|
| 4,316,181 | 2/1982 | Primont et al. | 340/571 |
| 4,808,981 | 2/1989 | Seibold | 340/568 |
| 4,985,695 | 1/1991 | Wilkinson et al. | 340/571 |
| 4,999,621 | 3/1991 | Loeb | 340/571 |

*Primary Examiner*—Glen Swann
*Attorney, Agent, or Firm*—Hitt Chwang & Gaines, P.C.

[57] ABSTRACT

The system includes (1) a sensor for detecting a separation of the portable computer from an object, the sensor transitioning from an inactivated state to an activated state when the portable computer is separated and (2) an alarm circuit coupled to the sensor and having a disarmed state and an armed state, the alarm circuit detecting when the sensor is in the activated state and issuing a notification when the alarm circuit is in the armed state and the sensor is in the activated state.

25 Claims, 2 Drawing Sheets

SECURITY SYSTEM AND METHOD FOR A PORTABLE PERSONAL COMPUTER

TECHNICAL FIELD OF THE INVENTION

The present invention is directed, in general, to computing machinery and, more specifically, to a system and method for allowing a portable computer to detect when it is being separated from a supporting surface, thereby indicating that it is being separated and, perhaps, stolen.

BACKGROUND OF THE INVENTION

As personal computers have increased in power and decreased in size, portable computers have become more useful and powerful. Initially, "portable" computers were essentially ruggedized desktop computers, requiring use of a desk top and access to household current. Eventually, battery-powered portable computers commonly featuring a liquid crystal display ("LCD") and weighing 10 to 20 pounds allowed true freedom for the computer user. Notebook computers weighing from 4 to 10 pounds and having a length and width approximating that of notebook paper offered an increased degree of portability, without substantially sacrificing desktop computer power. Notebook and other portable computers almost universally employ a clamshell design comprising a hinged housing that opens to an operating position wherein a keyboard and display screen within the clamshell are exposed for data input and display. In their closed position, the keyboard and display screen are protected from damage within the clamshell. Clamshell portable computers are primarily designed to accept data entry from a user seated before the computer. Such clamshell portable computers are particularly useful in applications requiring extensive entry of textual data, such as word processing or database interaction.

Since the advent of the notebook computer, evermore smaller clamshell portable computers have been tested in the marketplace. Some of these smaller units have not generally enjoyed much success, primarily due to limitations their size places on their input/output ("I/O") devices, particularly in their keyboards and display screens.

One solution to the above problem has come in the form of so-called tablet portable computers wherein the clamshell design as described above is eliminated in favor of a single, generally rectangular housing featuring only a display screen on an exterior surface thereof. Since the traditional keyboard is eliminated, data entry is primarily by way of stylus wherein a user writes or types on the display screen. Such tablet portable computers primarily find utility in applications as replacements for clipboards or other notetaking devices and thus are primarily designed to accept brief data entry from a user on the g.

Another solution to the problem has proven useful and quite popular. So-called personal digital assistants ("PDA"s), such as Newton® by Apple Computer, Inc., comprise a generally-rectangular chassis having a front surface thereon. The front surface is typically dominated by an LCD visual display. In contrast to most other computer designs, a PDA does not contain a traditional "QWERTY" or other-style keyboard. Instead, PDAs are equipped with a few control buttons on the front surface and a stylus. A user wishing to enter data to the PDA must use the stylus to write on the display.

Unfortunately, all of the above portable computers share a common problem that is, to large degree, brought about by their very capability. Their increasing lightness, portability, cost, familiarity and capacity to hold valuable data subject them to the risk of theft. Because users find their portable computers so useful, they carry them wherever they go, setting them on tables in the library, park benches, chairs at the office and the like.

The prior art has been unable to provide a simple, attractive solution to the problem of discouraging or preventing such theft. The prior art has offered cables that allow a user to lock the computer to a fixed object, but these cables are add-on devices that are heavy, bulky, unwieldy and quite unattractive.

Instead, what is needed in the art are a security system and method that are fully integrated into the portable computer, are effective and are easy for the user to enable and disable.

SUMMARY OF THE INVENTION

To address the above-discussed deficiencies of the prior art, it is a primary object of the present invention to provide an security system for a portable computer, the security system allowing a user to arm the portable computer to detect displacement thereof, the displacement indicating possible theft of the portable computer.

In the attainment of the above primary object, the present invention provides a security system and method for a portable computer. The system comprises: (1) a sensor for detecting a separation of the portable computer from an object, the sensor transitioning from an inactivated state to an activated state when the portable computer is separated and (2) an alarm circuit coupled to the sensor and having a disarmed state and an armed state, the alarm circuit detecting when the sensor is in the activated state and issuing a notification when the alarm circuit is in the armed state and the sensor is in the activated state.

An advantage of this arrangement is that the security system is integrated into the portable computer rather than being an attachment or an add-on. The sensor detects whether the computer is sufficiently close to a proximate object of the user's choice. If the computer is separated from that object, the sensor activates, triggering the alarm circuit.

In a preferred embodiment of the present invention, the sensor comprises a movable plunger portion contactible with the object when the portable computer is separated less than a predetermined distance from the object. Those of skill in the art will realize that, while the sensor may be a proximity sensor or a motion sensor (such as a mercury switch), a momentary switch provides distinct advantages. First, such switches are inexpensive and commonly used in computer systems. Second such switches are reliable and easily incorporated into the motherboard and chassis of a portable computer. Finally, such switches can be incorporated into a foot of the portable computer. In a more preferred embodiment, the portable computer comprises a motherboard having data processing and storage circuitry located thereon, the sensor located on the motherboard and extending through an outer case of the portable computer.

In a preferred embodiment of the present invention, the object is a supporting surface underlying the portable computer, the sensor is a momentary switch and the sensor transitions from the inactivated state to the activated state when the portable computer is separated from the supporting surface. In a more preferred embodiment, the portable computer comprises an outer case having a plurality of compliant feet mounted thereon, the feet providing support for the portable computer, the sensor embodied in one of the plurality of feet. The advantage of this embodiment is that the weight of the portable computer on the supporting surface retains the momentary switch in its inactivated state. When the weight of the portable computer is supported otherwise, as it is when lifted from the supporting surface, the momentary switch transitions to its activated state.

In a preferred embodiment of the present invention, the portable computer comprises general purpose data processing and storage circuitry, the general purpose data processing and storage circuitry forming a portion of the alarm circuit. As described above, the sensor is integrated into the portable computer to advantage. Likewise, the alarm circuit is preferably embodied in the general purpose data processing and storage circuitry of the portable computer. This eliminates needless duplication of hardware, thereby reducing the cost and volume of the portable computer.

In a preferred embodiment of the present invention, the system further comprises arming means for allowing a user to place the alarm circuit in the armed state. This arming means may take several forms. First, in portable computers employing a graphical user interface ("GUI"), the user may point to and click on an icon to arm the alarm. Alternatively, the user may arm the alarm with a password or keystroke combination, either on a QWERTY keyboard or the few keys found on a personal digital assistant ("PDA") portable computer. On stylus-based table portable computers, the user may use the stylus to sign his or her name, handwriting recognition software within the portable computer recognizing the handwriting and arming the alarm circuit.

In a preferred embodiment of the present invention, the system further comprises timer means for placing the alarm circuit in the armed state upon expiration of a predetermined period of time. Thus, the alarm circuit may arm automatically upon the occurrence of a sufficient period of inactivity. For instance, if the user does not interact with the computer for 5 minutes, the alarm circuit arms automatically.

In one embodiment of the present invention, the alarm circuit includes a delay circuit. The delay circuit allows the user time to place the computer proximate to the object once the user has armed the alarm. The delay may be programmable. For instance, the delay circuit may be programmed to wait 15 seconds to arm the alarm once the user has initiated arming. The user thus has 15 seconds to set the computer down.

In a preferred embodiment of the present invention, the system further comprises a display screen coupled to the data processing and storage circuitry, the alarm circuit adapted to display a warning message on the display screen when the alarm circuit is in the armed state. When the alarm circuit is armed, software within the portable computer may direct a warning message to be displayed on the computer's display screen. Alternatively or additionally, a tone may be generated or sound (".WAV") file played.

In a preferred embodiment of the present invention, the system further comprises disarming means for allowing a user to place the alarm circuit in the disarmed state, the disarming means requiring entry of a password from the user via an input device of the portable computer. The above-described alternatives for arming the alarm circuit are also available for disarming the alarm circuit. For instance, disarming may be by password or name-signing, and the delay circuit may be present to allow the user time to pick up and disarm the portable computer.

In a preferred embodiment of the present invention, the notification is selected from the group consisting of: (1) an audible alarm and (2) a visual alarm. In a more preferred embodiment, the notification is an audible alarm selected from the group consisting of: (1) a generated tone (such as a beep or .WAV file) and (2) a spoken message (such as a .WAV file). The notification may be immediate or delayed (again, to allow the user time to disarm the alarm. The notification may include an alarm message displayed on the portable computer's display screen.

The notification may also include communication by the portable computer to some predesignated remote receiver. For instance, if the portable computer is equipped with a cell phone transmitter, the transmitter may be directed to dial a preset number and transmit data or an audible message indicating that the alarm has been tripped. A wireless modem or pager may alternatively be used.

Once the alarm has been tripped, software within the portable computer may record the date and time of the trip for evidentiary purposes (to convict the person responsible for tripping the alarm). The computer may also take steps to protect the valuable data therein. For instance, software within the portable computer may direct the display screen to be inactivated, disabling the thief from reading important data. The software may also or alternatively lock files or destroy any stored encryption keys, thereby rendering data files difficult or impossible to recover (absent knowledge of the keys).

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
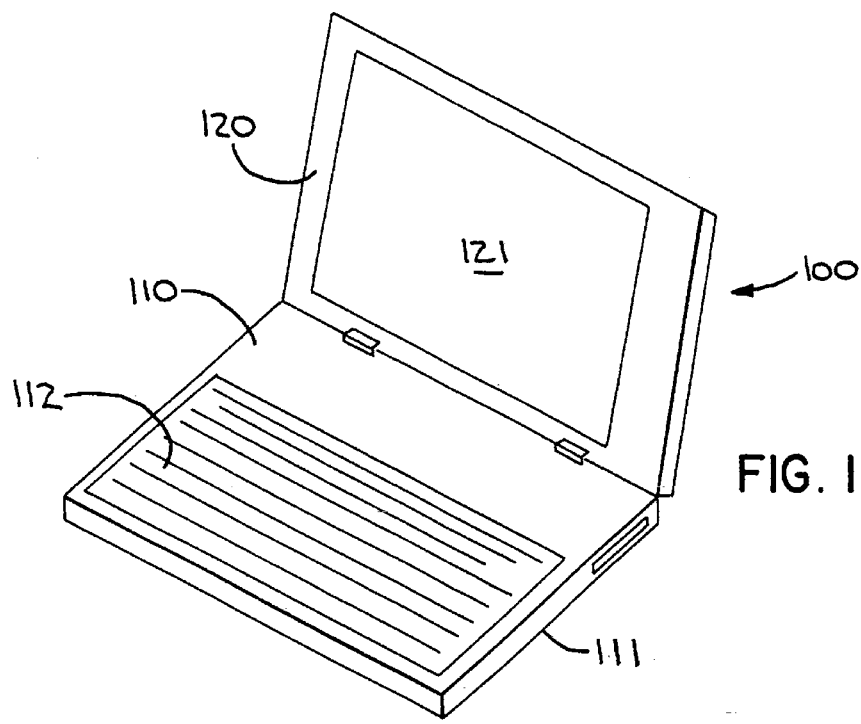
FIG. 1 illustrates an isometric view of a portable computer embodying the security system and method of the present invention.

Referring initially to FIG. 1, illustrate is an isometric view of a portable computer, generally designated 100, embodying the security system and method of the present invention. The portable computer 100 comprises a lower portion 110 and an upper portion 120. The lower portion 110 comprises an outer shell or chassis 111 that contains various, compactly-arranged electronic components of the portable computer 100 and a keyboard 112 allowing a user to transmit data to the portable computer 100. The upper portion 120 contains a monitor or display screen 121 allowing the portable computer 100 to communicate data to the user.

The lower portion 110 and the upper portion 120 are hinged together so as to allow the lower portion 110 and the upper portion 120 to rotate relative to each other. This allows the portable computer 100 to assume a closed, storage position wherein the upper and lower portions 110, 120 shield the keyboard 112 and the monitor 121 from damage and wherein the portable computer 100 can be conveniently stored. The portable computer 100 can also assume (as shown) an open, operating position wherein the keyboard 112 and the monitor 121 are exposed to a user for communication therewith.

Figure 2:
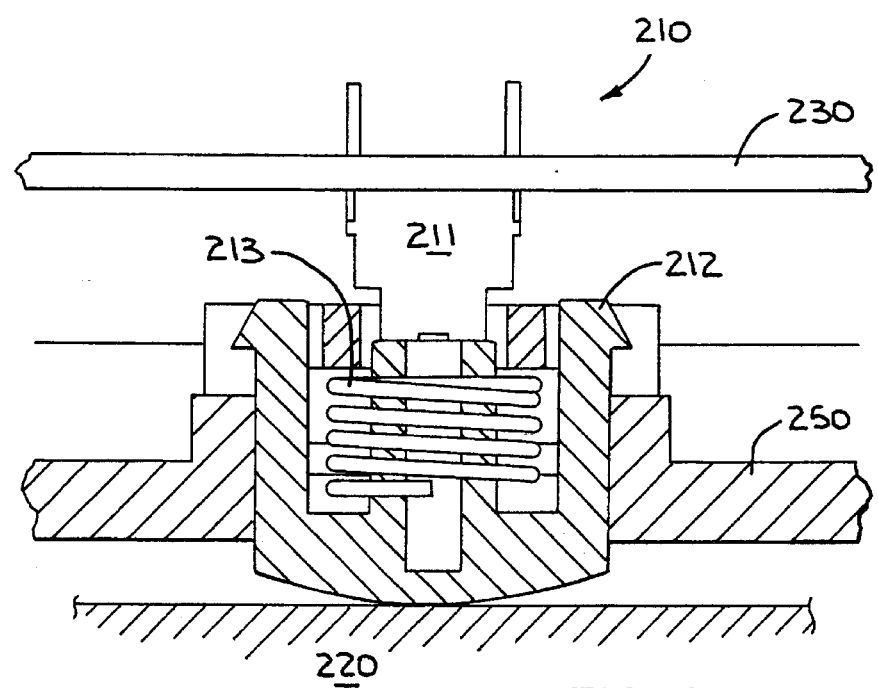
FIG. 2 illustrates a sectional elevational view of the portable computer of FIG. 1 detailing, in particular, the sensor of the security system of the present invention.

Turning now to FIG. 2, illustrated is a partial sectional elevational view of the portable computer of FIG. 1. The security system of the present invention comprises a sensor 210. The sensor 210 is positioned to detect a separation of the portable computer 100 from an object 220, such as a surface supporting the portable computer 100. The sensor 210 transitions from an inactivated state to an activated state when the portable computer 100 is separated from the object 220.

In the illustrated embodiment, the sensor 210 comprises a momentary switch body 211 (electrically joined in a conventional manner to a motherboard 230, a movable plunger portion 212 biased outwardly by a spring 213 through a recess in an outer case 250 of the portable computer 100. The movable plunger portion 212 is contactible with the object 220 when the portable computer 100 is separated less than a predetermined distance from the object 220. When the portable computer 100 and the object 220 are separated by less than the predetermined distance, the spring 213 is compressed, the plunger 212 assumes a retracted position and the sensor 210 assumes the inactivated state. As the portable computer 100 is separated (lifted, in a more preferred embodiment) from the object 220, the plunger 212 travels toward an extended position under force from the spring 213, eventually changing the state of the sensor 210 to the activated state. Again, those of skill in the art will realize that, while the sensor 210 may be a proximity sensor or a motion sensor (such as a mercury switch), a momentary switch (within the switch body 211) provides distinct advantages. First, such switches are inexpensive and commonly used in computer systems. Second such switches are reliable and easily incorporated into the motherboard and chassis of a portable computer. Finally, such switches can be incorporated into a foot of the portable computer 100.

In the illustrated embodiment, the object 220 is a supporting surface underlying the portable computer 100, the sensor 210 is a momentary switch and the sensor 210 transitions from the inactivated state to the activated state when the portable computer 100 is separated from the supporting surface. Although not shown in FIG. 2, the motherboard 230 has data processing and storage circuitry (350 of FIG. 3) located thereon and coupled to the sensor 210. The sensor 210 is preferably located on the motherboard 230 and extends, as shown, through an outer case 250 of the portable computer 100. The outer case 250 has a plurality of conventional compliant feet mounted thereon, the feet providing resilient support for the portable computer 100. The sensor 210 is illustrated as being embodied in one of the plurality of feet 260. The advantage of this embodiment is that the weight of the portable computer 100 on the supporting surface retains the sensor 210 in its inactivated state. When the weight of the portable computer 100 is supported otherwise, as it is when lifted from the supporting surface, the sensor 210 transitions to its activated state.

Figure 3:
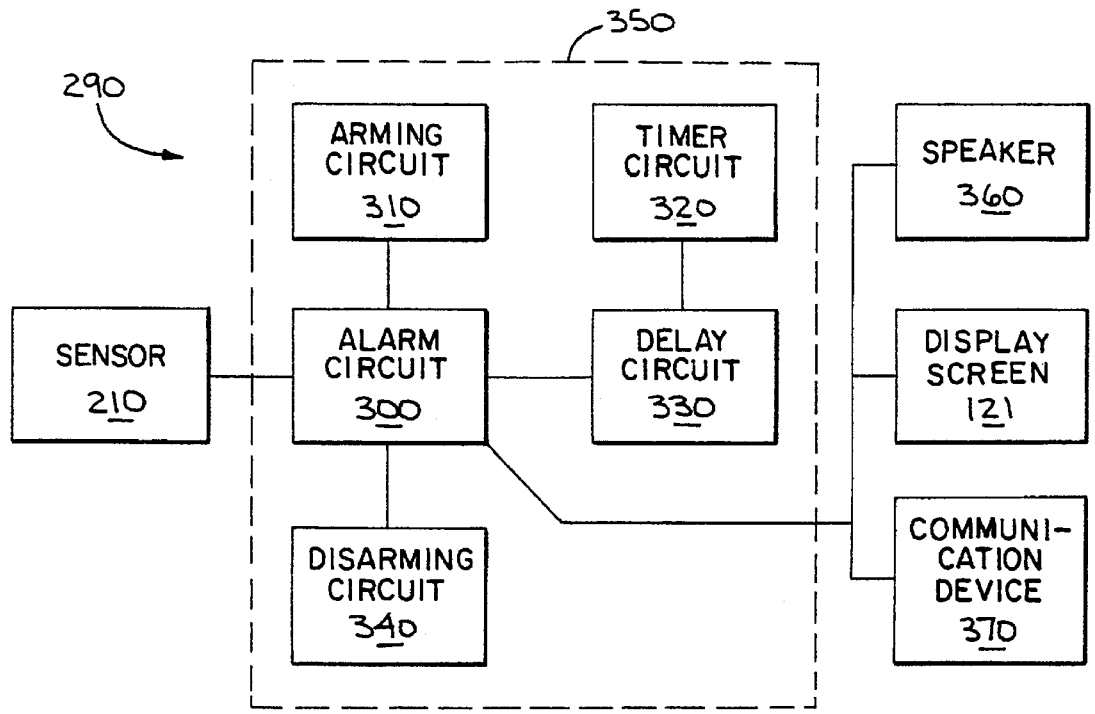
FIG. 3 illustrates a block diagram of the security system of the present invention.

Turning now to FIG. 3, illustrated is a block diagram of the security system of the present invention. The system, generally designated 290, comprises the sensor 210 and the alarm circuit, now designated 300.

In the illustrated embodiment, the portable computer 100 comprises general purpose data processing and storage circuitry 350, the general purpose data processing and storage circuitry comprising the alarm circuit. As described above, the sensor 210 is integrated into the portable computer 100 to advantage. Likewise, the alarm circuit is preferably embodied as a sequence of software instructions designed to be executed in the general purpose data processing and storage circuitry of the portable computer 100. This eliminates needless duplication of hardware, thereby reducing the cost and volume of the portable computer 100. Thus, the security system is integrated into the portable computer 100 rather than being an attachment or an add-on.

The alarm circuit 300 has a disarmed state and an armed state and is coupled to the sensor 210 to detect when the sensor 210 is in the activated state. When the alarm circuit 300 is in the armed state and the sensor 210 transitions into its activated state, the alarm circuit 300 issues a notification.

In the illustrated embodiment, the system further comprises arming means 310 for allowing a user to place the alarm circuit 300 in the armed state. This arming means 310 may take several forms. As stated previously, in portable computers employing a graphical user interface ("GUI"), the user may point to and click on an icon to arm the alarm. Alternatively, the user may arm the alarm with a password or keystroke combination, either on a QWERTY keyboard or the few keys found on a personal digital assistant ("PDA") portable computer. On stylus-based table portable computers, the user may use the stylus to sign his or her name, handwriting recognition software within the portable computer 100 recognizing the handwriting and arming the alarm circuit 300.

In the illustrated embodiment, the system further comprises timer means 320 for placing the alarm circuit 300 in the armed state upon expiration of a predetermined period of time. Thus, the alarm circuit 300 may arm automatically upon the occurrence of a sufficient period of inactivity. For instance, if the user does not interact with the computer for 5 minutes, the alarm circuit 300 arms automatically.

In one embodiment of the present invention, the alarm circuit 300 includes a delay circuit 330. The delay circuit 330 allows the user time to place the computer 100 proximate to the object 220 once the user has armed the alarm circuit 300. The delay may be programmable. For instance, the delay circuit 330 may be programmed to wait 15 seconds to arm the alarm circuit 300 once the user has initiated arming. The user thus has 15 seconds to set the computer 100 down.

As in FIG. 1, a display screen 121 is coupled to the data processing and storage circuitry 350. When the alarm circuit 300 is armed, software within the portable computer 100 may direct a warning message to be displayed on the computer's display screen 121. Alternatively or additionally, a tone may be generated or .WAV file played.

In the illustrated embodiment, the system further comprises disarming means 340 for allowing a user to place the alarm circuit 300 in the disarmed state. As stated previously, the disarming means 340 may require entry of a password from the user via an input device of the portable computer 100. The above-described alternatives for arming the alarm circuit 300 are also available for disarming the alarm circuit 300. For instance, disarming may be by password or name-signing, and the delay circuit 330 may be present to allow the user time to pick up and disarm the portable computer 100.

In the illustrated embodiment, the notification may be an audible alarm (via a speaker 360), a visual alarm (via the display screen 121), a combination of both or a remote alarm (via a communication device 370, such as a transmitter). In a more preferred embodiment, the notification comprises an audible alarm that may be either a generated tone (such as a beep or .WAV file), a spoken message (such as a .WAV file) or both. The notification may be immediate or delayed (again, to allow the user time to disarm the alarm circuit 300. The notification may include an alarm message displayed on the portable computer's display screen 121.

The notification may also include communication by the portable computer 100 to some predesignated remote receiver. For instance, if the portable computer 100 is equipped with a cell phone transmitter, the transmitter may be directed to dial a preset number and transmit data or an audible message indicating that the alarm has been tripped. A wireless modem or pager may alternatively be used.

Once the alarm has been tripped, software within the portable computer 100 may record the date and time of the trip for evidentiary purposes (to convict the person responsible for tripping the alarm). The portable computer 100 may also take steps to protect the valuable data therein. For instance, software within the portable computer 100 may direct the display screen to be inactivated, disabling the thief from reading important data. The software may also or alternatively lock files or destroy any stored encryption keys, thereby rendering data files difficult or impossible to recover (absent knowledge of the keys).

Figure 4:
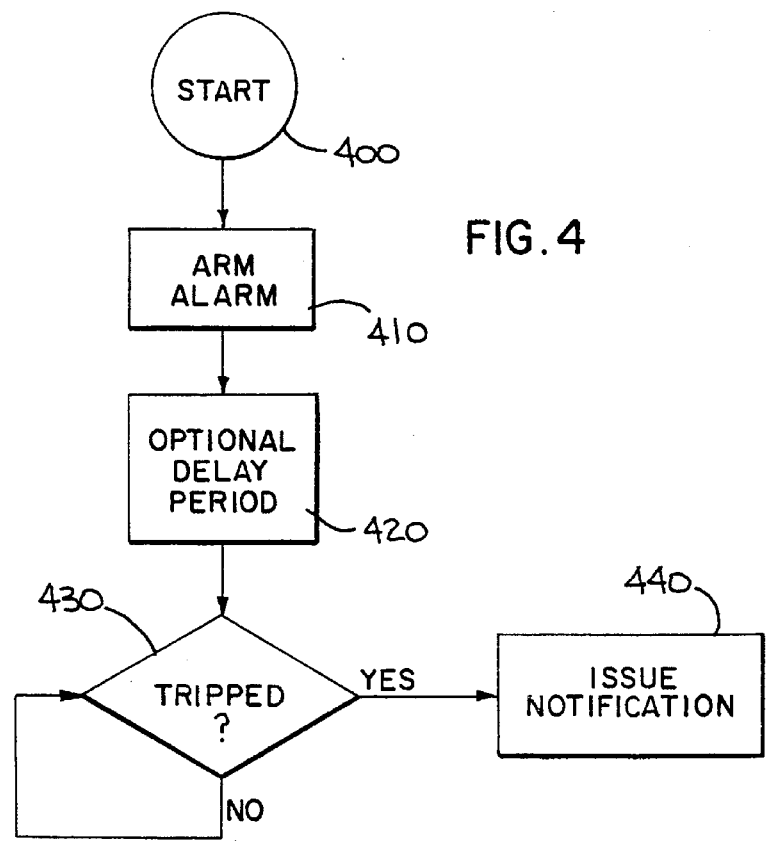
FIG. 4 illustrates a flow diagram of the security method of the present invention.

Turning now to FIG. 4, illustrated is a flow diagram of the security method of the present invention. The method begins in a start block 400, when the alarm circuit is in the disarmed state. In a block 410, the alarm circuit is armed. An optional delay period may delay notification (a block 420), allowing the user to set the portable computer 100 down on a convenient supporting surface.

Once armed, the portable computer monitors the sensor 210 (a block 430) until tripped. If tripped, the alarm circuit 300 may delay, allowing the user to disarm the alarm circuit 300. If there is no delay, or the delay period expires, the portable computer 100 issues a notification (a block 440) and, optionally, generates a record of the date and time the alarm circuit 300 was tripped. Steps may also optionally be taken to protect the data stored in the portable computer 100, such as by inactivating the display screen 121, locking files or erasing encryption keys.

From the above description, it is apparent that the present invention provides a security system and method for a portable computer. The system comprises: (1) a sensor for detecting a separation of the portable computer from an object, the sensor transitioning from an inactivated state to an activated state when the portable computer is separated and (2) an alarm circuit coupled to the sensor and having a disarmed state and an armed state, the alarm circuit detecting when the sensor is in the activated state and issuing a notification when the alarm circuit is in the armed state and the sensor is in the activated state.

Although the present invention and its advantages have been described in detail, those skilled in the art should understand that they can make various changes, substitutions and alterations herein without departing from the spirit and scope of the invention in its broadest form.

What is claimed is:

1. A security system for a portable computer, said portable computer having general purpose data processing and storage circuitry, said security system comprising:

a sensor for detecting a separation of said portable computer from an object, said sensor transitioning from an inactivated state to an activated state when said portable computer is separated;

an alarm circuit integrated in said general purpose data processing and storage circuitry and coupled to said sensor and having a disarmed state and an armed state, said alarm circuit detecting when said sensor is in said activated state and issuing a notification when said alarm circuit is in said armed state and said sensor is in said activated state; and a computer input device for providing data to said general purpose data processing and storage circuitry to selectively place said alarm circuit in said armed state and said disarmed state.

2. The system as recited in claim 1 wherein said sensor comprises a movable plunger portion contactible with said object when said portable computer is separated less than a predetermined distance from said object.

3. The system as recited in claim 1 wherein said object is a supporting surface underlying said portable computer, said sensor transitioning from said inactivated state to said activated state when said portable computer is separated from said supporting surface, said sensor being a momentary switch.

4. The system as recited in claim 1 wherein said input device is selected from the group consisting of a keyboard, a mouse, a stylus pin or voice recognition device, said input device allowing a user to place said alarm circuit in a disarmed state, by providing a password from said user via said input device of said portable computer.

5. The system as recited in claim 1 wherein said notification is selected from the group consisting of:

an audible alarm; and a visual alarm.

6. A security system for a portable computer, comprising:

a sensor for detecting a separation of said portable computer from an object, said sensor transitioning from an inactivated state to an activated state when said portable computer is separated;

an alarm circuit coupled to said sensor and having a disarmed state and an armed state, said alarm circuit detecting when said sensor is in said activated state and issuing a notification when said alarm circuit is in said armed state and said sensor is in said activated state; and timer means for placing said alarm circuit in said armed state upon expiration of a predetermined period of time of data input inactivity.

7. A security system for a portable computer, comprising:

a sensor for detecting a separation of said portable computer from an object, said sensor transitioning from an inactivated state to an activated state when said portable computer is separated, said portable computer comprising a motherboard having data processing and storage circuitry located thereon, said sensor located on said motherboard and extending through an outer case of said portable computer; and an alarm circuit coupled to said sensor and having a disarmed state and an armed state, said alarm circuit detecting when said sensor is in said activated state and issuing a notification when said alarm circuit is in said armed state and said sensor is in said activated state.

8. A security system for a portable computer, comprising:

a sensor for detecting a separation of said portable computer from an object, said sensor transitioning from an inactivated state to an activated state when said portable computer is separated, said portable computer comprising an outer case having a plurality of compliant feet mounted thereon, said feet providing support for said portable computer, said sensor embodied in one of said plurality of feet; and an alarm circuit coupled to said sensor and having a disarmed state and an armed state, said alarm circuit detecting when said sensor is in said activated state and issuing a notification when said alarm circuit is in said armed state and said sensor is in said activated state.

9. A method of providing security for a portable computer, comprising the steps of:

detecting a separation of said portable computer from an object with a sensor, said sensor transitioning from an inactivated state to an activated state when said portable computer is separated;

issuing a notification with an alarm circuit coupled to said sensor, said step of issuing comprises the step of issuing said notification with general purpose data processing and storage circuitry, said general purpose data processing and storage circuitry forming a portion of said alarm circuit, said alarm circuit having a disarmed state and an armed state, said alarm circuit detecting when said sensor is in said activated state, said alarm circuit issuing said notification when said alarm circuit is in said armed state and said sensor is in said activated state; and providing data to said general purpose data processing and storage circuitry via a computer input device to selectively place the alarm circuit in said armed state and said disarmed state.

10. The method as recited in claim 9 wherein said step of detecting comprises the step of displacing a movable plunger portion of said sensor, said movable plunger portion contactible with said object when said portable computer is separated less than a predetermined distance from said object.

11. The method as recited in claim 9 wherein said object is a supporting surface underlying said portable computer, said sensor is a momentary switch and said step of detecting comprises the step of transitioning from said inactivated state to said activated state when said portable computer is separated from said supporting surface.

12. The method as recited in claim 9 wherein said step of providing data includes the step of providing a password to said general purpose data processing and storage circuitry via an input device selected from the group consisting of a keyboard, a mouse, stylus and voice recognition device, thereby allowing a user to place said alarm circuit in a disarmed state.

13. The method as recited in claim 9 wherein said step of issuing comprises the step of issuing a notification selected from the group consisting of:

an audible alarm; and a visual alarm.

14. A method of providing security for a portable computer, comprising the steps of:

detecting a separation of said portable computer from an object with a sensor, said sensor transitioning from an inactivated state to an activated stated when said portable computer is separated;

issuing a notification with an alarm circuit coupled to said sensor, said alarm circuit having a disarmed state and an armed stated, said alarm circuit detecting when said sensor is in said activated state, said alarm circuit issuing said notification when said alarm circuit is in said armed state and said sensor is in said activated state; and placing said alarm circuit in said armed state with timer means upon expiration of a predetermined period of time of data input inactivity.

15. A method of providing security for a portable computer, comprising the steps of:

detecting a separation of said portable computer from an object with a sensor, said sensor transitioning from an inactivated state to an activated state when said portable computer is separated, said portable computer comprising a motherboard having data processing and storage circuitry located thereon and said step of detecting comprises the step of detecting said movement with a sensor located on said motherboard and extending through an outer case of said portable computer; and issuing a notification with an alarm circuit coupled to said sensor, said alarm circuit having a disarmed state and an armed state, said alarm circuit detecting when said sensor is in said activated state, said alarm circuit issuing said notification when said alarm circuit is in said armed state and said sensor is in said activated state.

16. A method of providing security for a portable computer, comprising the steps of:

detecting a separation of said portable computer from an object with a sensor, said sensor transitioning from an inactivated state to an activated state when said portable computer is separated, said portable computer comprising an outer case having a plurality of compliant feet mounted thereon, said feet providing support for said portable computer and said step of detecting comprises the step of detecting said movement with a sensor embodied in one of said plurality of feet; and issuing a notification with an alarm circuit coupled to said sensor, said alarm circuit having a disarmed state and an armed state, said alarm circuit detecting when said sensor is in said activated state, said alarm circuit issuing said notification when said alarm circuit is in said armed state and said sensor is in said activated state.

17. A portable computer, comprising:

a housing;

general purpose data processing and storage circuitry contained within said housing;

a sensor for detecting a separation of said portable computer from an object, said sensor transitioning from an inactivated state to an activated state when said portable computer is separated;

an alarm circuit coupled to said sensor and having a disarmed state and an armed state, said alarm circuit detecting when said sensor is in said activated state and issuing a notification when said alarm circuit is in said armed state and said sensor is in said activated state, said alarm circuit integrated with said general purpose data processing and storage circuitry; and a computer input device for providing data to said general purpose data processing and storage circuitry to selectively place the alarm circuit in said armed stated and said disarmed state.

18. The computer as recited in claim 17 wherein said sensor comprises a movable plunger portion contactible with said object when said portable computer is separated less than a predetermined distance from said object.

19. The computer as recited in claim 17 wherein said object is a supporting surface underlying said portable computer, said sensor transitioning from said inactivated state to said activated state when said portable computer is separated from said supporting surface, said sensor being a momentary switch.

20. The computer as recited in claim 17 wherein said portable computer comprises a motherboard having said data processing and storage circuitry located thereon, said sensor located on said motherboard and extending through an outer case of said portable computer.

21. The computer as recited in claim 17 wherein said notification is selected from the group consisting of:
    an audible alarm; and
    a visual alarm.

22. The computer as recited in claim 17 wherein said notification is an audible alarm selected from the group consisting of:
    a generated tone; and
    a spoken message.

23. The computer as recited in claim 17 further comprising a display screen coupled to said data processing and storage circuitry, said alarm circuit adapted to display a warning message on said display screen when said alarm circuit is in said armed state.

24. A security system for a portable computer, comprising:
    a sensor for detecting a separation of said portable computer from an object, said sensor transitioning from an inactivated state to an activated state when said portable computer is separated;
    an alarm circuit coupled to said sensor and having a disarmed state and an armed state, said alarm circuit detecting when said sensor is in said activated state and issuing a notification when said alarm circuit is in said armed state and said sensor is in said activated state; and
    timer means for placing said alarm circuit in said armed state upon expiration of a predetermined period of time of data input inactivity.

25. A portable computer, comprising:
    a housing;
    general purpose data processing and storage circuitry contained within said housing;
    a sensor for detecting a separation of said portable computer from an object, said sensor transitioning from an inactivated state to an activated state when said portable computer is separated;
    an alarm circuit coupled to said sensor and having a disarmed state and an armed state,
    said alarm circuit detecting when said sensor is in said activated state and issuing a notification when said alarm circuit is in said armed state and said sensor is in said activated state, said general purpose data processing and storage circuitry forming a portion of said alarm circuit;
    arming means for allowing a user to place said alarm circuit in said armed state; and
    disarming means for allowing said user to place said alarm circuit in said disarmed state, said disarming means requiring entry of a password from said user via an input device coupled to said data processing and storage circuitry of said portable computer, said portable computer further including an outer case having a plurality of compliant feet mounted thereon, said feet providing support for said portable computer, said sensor embodied in one of said plurality of feet.

* * * * *

UNITED STATES PATENT AND TRADEMARK OFFICE
CERTIFICATE OF CORRECTION

PATENT NO. : 5,578,991
DATED : November 26, 1996
INVENTOR(S) : Erica J. Scholder It is certified that error appears in the above-indentified patent and that said Letters Patent is hereby corrected as shown below:

Column 1, line 53, "g" should be --go--.

Signed and Sealed this

Fourth Day of March, 1997

Attest:

BRUCE LEHMAN

Attesting Officer

Commissioner of Patents and Trademarks